United States Patent
Hallivuori et al.

(10) Patent No.: US 10,404,531 B2
(45) Date of Patent: Sep. 3, 2019

(54) NETWORK ELEMENT OF A SOFTWARE-DEFINED NETWORK

(71) Applicant: XIEON NETWORKS S.A.R.L., Luxembourg (LU)

(72) Inventors: Ville Hallivuori, Espoo (FI); Juhamatti Kuusisaari, Helsinki (FI)

(73) Assignee: XIEON NETWORKS S.A.R.L., Luxembourg (LU)

( * ) Notice: Subject to any disclaimer, the term of this patent is extended or adjusted under 35 U.S.C. 154(b) by 727 days.

(21) Appl. No.: 14/643,421

(22) Filed: Mar. 10, 2015

(65) Prior Publication Data

US 2015/0263888 A1 Sep. 17, 2015

(30) Foreign Application Priority Data

Mar. 12, 2014 (FI) .................................. 20145225

(51) Int. Cl.
*H04L 12/24* (2006.01)
*H04L 29/08* (2006.01)
(Continued)

(52) U.S. Cl.
CPC .......... *H04L 41/0803* (2013.01); *H04L 45/22* (2013.01); *H04L 45/38* (2013.01);
(Continued)

(58) Field of Classification Search
CPC ..... H04L 41/0803; H04L 45/22; H04L 45/38; H04L 45/50; H04L 45/54; H04L 69/321
(Continued)

(56) References Cited

U.S. PATENT DOCUMENTS 7,706,316 B1 4/2010 Kuik
9,253,117 B1 * 2/2016 Poutievski .............. H04L 41/12
(Continued)

FOREIGN PATENT DOCUMENTS

| CN | 103067534 | 4/2013 |
| CN | 103152264 | 6/2013 |
| EP | 2 615 781 A1 | 7/2013 |

OTHER PUBLICATIONS

ONF, Open Networking Foundation: "OpenFlow Switch Specification", Version 1.3.3 (Protocol version 0x04), Sep. 27, 2013, [retrieved on Feb. 10, 2014.]. retrieved from the Internet: <URL: https://www.opennetworking.org/images/stories/downloads/sdn-resources/onf-specifications/openflow/openflow-spec-v1.3.3.pdf>, 164 pages chapter 5.1.

(Continued)

*Primary Examiner* — Nicholas R Taylor
*Assistant Examiner* — Chong G Kim
(74) *Attorney, Agent, or Firm* — Young & Thompson

(57) ABSTRACT

A network element of a software-defined network comprises a data transfer interface (210) for receiving and transmitting data and a processing system (215) for constructing a software-defined data path and a fixed-functionality data path such as for example an IP/MPLS or L2 switching path. The software-defined data path comprises look-up tables for selecting software-defined actions and the fixed-functionality data path defines fixed-functionality actions. The processing system is adapted to convert metadata associated with data managed by the software-defined data path to a data format suitable for the fixed-functionality data path when one or more of the fixed-functionality actions are needed in conjunction with forwarding the data. One of the fixed-functionality actions is selected at least partly on the basis of which one of the look-up tables was most recently (Continued)

accessed, and the determined fixed-functionality action is carried out so as to initiate the one or more needed fixed-functionality actions.

19 Claims, 4 Drawing Sheets

(51) Int. Cl.
    *H04L 12/707*     (2013.01)
    *H04L 12/721*     (2013.01)
    *H04L 12/723*     (2013.01)
    *H04L 12/741*     (2013.01)

(52) U.S. Cl.
    CPC .............. *H04L 45/50* (2013.01); *H04L 45/54* (2013.01); *H04L 69/321* (2013.01)

(58) Field of Classification Search
    USPC ........................................................ 709/226
    See application file for complete search history.

(56) References Cited

U.S. PATENT DOCUMENTS

| | | | |
|---|---|---|---|
| 9,264,301 B1* | 2/2016 | Chua | H04L 45/02 |
| 9,276,877 B1* | 3/2016 | Chua | H04L 45/02 |
| 9,450,823 B2* | 9/2016 | Arora | H04L 41/082 |
| 9,705,783 B2* | 7/2017 | Jogalekar | H04L 45/125 |
| 2008/0112400 A1* | 5/2008 | Dunbar | H04L 12/2697 |
| | | | 370/360 |
| 2013/0176850 A1* | 7/2013 | Mishra | H04L 49/00 |
| | | | 370/235 |
| 2013/0266007 A1* | 10/2013 | Kumbhare | H04L 45/56 |
| | | | 370/389 |
| 2013/0272135 A1* | 10/2013 | Leong | H04L 41/0823 |
| | | | 370/241 |
| 2013/0318243 A1* | 11/2013 | Chinthalapati | H04L 45/52 |
| | | | 709/226 |
| 2014/0112190 A1* | 4/2014 | Chou | H04L 41/0226 |
| | | | 370/254 |
| 2014/0149542 A1* | 5/2014 | Luo | H04L 45/02 |
| | | | 709/217 |
| 2015/0016449 A1* | 1/2015 | Tardo | H04L 47/2483 |
| | | | 370/389 |
| 2015/0043382 A1* | 2/2015 | Arora | H04L 41/0803 |
| | | | 370/254 |
| 2015/0138976 A1* | 5/2015 | Lu | H04L 49/1546 |
| | | | 370/235 |
| 2015/0350156 A1 | 12/2015 | Ma et al. | |
| 2015/0381476 A1* | 12/2015 | Oshima | H04L 12/4625 |
| | | | 370/219 |
| 2016/0006583 A1* | 1/2016 | Takashima | H04L 12/4645 |
| | | | 370/392 |
| 2016/0036706 A1* | 2/2016 | Hiscock | H04L 12/462 |
| | | | 370/230 |

OTHER PUBLICATIONS

FI Search Report, dated Oct. 10, 2014, from corresponding FI application.
European Search Report, dated Jul. 3, 2015; Application No. 15 15 8147.

* cited by examiner

NETWORK ELEMENT OF A SOFTWARE-DEFINED NETWORK

FIELD OF THE INVENTION

The invention relates generally to a software-defined network "SDN". More particularly, the invention relates to a network element for a software-defined network. Furthermore, the invention relates to a method for managing data in a network element of a software-defined network. Furthermore, the invention relates to a computer program for a network element of a software-defined network.

BACKGROUND

Software-defined networking is an emerging architecture for data transfer networks. In a software-defined network "SDN", the control plane is separated from the data plane so that the control plane is implemented in one or more controllers that can be separate from the network elements and the data plane is implemented in the network elements. The network elements can be, for example, Internet Protocol "IP" routers, multiprotocol label switching "MPLS" nodes, packet optical switches, and/or Ethernet switches. Each network element may consist of a single apparatus or a combination of a plurality of apparatuses. Typically, the software-defined networking allows for quick experimenting and optimization of switching and/or routing policies and external access to the innards of network elements that formerly were closed and proprietary.

The one or more controllers of the software-defined network "SDN" are adapted to configure the network elements so that the network elements are capable of operating as nodes of the software-defined network. When configuring a network element, the controller sends to the network element configuration data with the aid of which the network element constructs a programmable data path for forwarding data. The programmable data path comprises one or more look-up tables with the aid of which the network element is capable of operating as a part of the software-defined network. The software-defined data path can be constructed in accordance with for example the OpenFlow protocol or the Forwarding and Control Element Separation "ForCES" protocol. More details about the OpenFlow can be found from the OpenFlow Switch Specification managed by the Open Networking Foundation "ONF", and more details about the ForCES can be found from the Request for Comments "RFC": 3746 "Forwarding and Control Element Separation", the Internet Engineering Task Force "IETF", Network Working Group.

In many cases there is, however, a need for hybrid network elements where both the above-presented programmable data path based on the software-defined networking and a traditional fixed-functionality data path are maintained for forwarding data. The fixed-functionality data path can support for example one or more Open Systems Interconnection "OSI" model Level 3 "L3" network layer protocols, one or more OSI L2 data link layer protocols, and/or the MultiProtocol Label Switching "MPLS" protocol. The one or more L3 network layer routing protocols may comprise for example the Internet Protocol "IP", and the one or more L2 data link layer switching protocols may comprise for example the Ethernet protocol. The fixed functionality data path may comprise for example an Internet protocol forwarding table, an Access Control List "ACL" filter, and other entities for fixed-functionality actions.

Hybrid network elements of the kind described above are, however, not free from challenges. One of the challenges is related to a need to switch from the programmable data path to the fixed-functionality data path and vice versa in situations where data being managed is first managed in one of the above-mentioned data paths and then it turns out that functionality provided by the other one of the data paths is needed for further actions related to the data under consideration. In traditional hybrid network elements, the transfer from the programmable data path to the fixed-functionality data path is accomplished by switching from the end of the programmable data path to the beginning of the fixed-functionality data path. The switching always to the beginning of the fixed-functionality data path loads the network processing unit "NPU" and/or other hardware for implementing the fixed-functionality data path. Switching in the opposite direction from the fixed-functionality data path to the programmable data path is typically not supported.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new network element for a software-defined network. The network element can be, for example, an Internet Protocol "IP" router, a multiprotocol label switching "MPLS" switch, a packet optical switch, and/or an Ethernet switch. A network element according to the invention comprises a data transfer interface for receiving and transmitting data and a processing system adapted to:

construct, in accordance with configuration data received from a controller of the software-defined network, a software-defined data path for managing first data to be forwarded, the software-defined data path comprising lookup tables for selecting software-defined actions and one or more of the software-defined actions modifying first metadata associated with the first data, configure, in accordance with forwarding-parameter data received at the network element, a fixed-functionality data path for managing second data to be forwarded, the fixed-functionality data path defining fixed-functionality actions and one or more of the fixed-functionality actions modifying second metadata associated with the second data, convert the first metadata associated with the first data being managed by the software-defined data path to a data format suitable for the fixed-functionality data path in response to a need to carry out one or more of the fixed-functionality actions in conjunction with forwarding the first data, determine one of the fixed-functionality actions from among the fixed-functionality actions at least partly on the basis of which one of the look-up tables was most recently accessed when managing the first data, and control the determined one of the fixed-functionality actions to be carried out so as to initiate the needed one or more fixed-functionality actions to be carried out at least partly in accordance with the converted first metadata.

As the metadata is converted prior to switching from the software-defined data path based on the software-defined networking to the fixed-functionality data path, it is not necessary to switch always to the beginning of the fixed-functionality data path but the operation can be continued at a desired point of the fixed-functionality data path. Thus, the loading of the hardware implementing the fixed-functionality data path can be reduced when switching from the programmable data path to the fixed-functionality data path.

In this document, the term "fixed-functionality" means functionality where parameter values are changeable but which is otherwise pre-determined. An exemplifying fixed-functionality action is the Internet Protocol "IP"-address look-up which can be adapted to correspond to a desired forwarding table with the aid of suitable routing and forwarding data which represents an example of the forwarding-parameter data for configuring the fixed-functionality data path.

In a network element according to an exemplifying and non-limiting embodiment of the invention, the processing system is adapted to enable switching from the fixed-functionality data path to the software-defined data path in a corresponding way.

In accordance with the invention, there is provided also a new method for managing data in a network element of a software-defined network. A method according to the invention comprises:
- maintaining, in accordance with configuration data received from a controller of the software-defined network, a software-defined data path for managing first data to be forwarded, the software-defined data path comprising look-up tables for selecting software-defined actions and one or more of the software-defined actions modifying first metadata associated with the first data,
- maintaining, in accordance with forwarding-parameter data received at the network element, a fixed-functionality data path for managing second data to be forwarded, the fixed-functionality data path defining fixed-functionality actions and one or more of the fixed-functionality actions modifying second metadata associated with the second data,
- converting the first metadata associated with the first data being managed by the software-defined data path to a data format suitable for the fixed-functionality data path in response to a need to carry out one or more of the fixed-functionality actions in conjunction with forwarding the first data,
- determining one of the fixed-functionality actions from among the fixed-functionality actions at least partly on the basis of which one of the look-up tables was most recently accessed when managing the first data, and
- controlling the determined one of the fixed-functionality actions to be carried out so as to initiate the needed one or more fixed-functionality actions to be carried out at least partly in accordance with the converted first metadata.

In accordance with the invention, there is provided also a new computer program for a network element of a software-defined network. A computer program according to the invention comprises computer executable instructions for controlling a programmable processing system of the network element to:
- construct, in accordance with configuration data received from a controller of the software-defined network, a software-defined data path for managing first data to be forwarded, the software-defined data path comprising lookup tables for selecting software-defined actions and one or more of the software-defined actions modifying first metadata associated with the first data,
- configure, in accordance with forwarding-parameter data received at the network element, a fixed-functionality data path for managing second data to be forwarded, the fixed-functionality data path defining fixed-functionality actions and one or more of the fixed-functionality actions modifying second metadata associated with the second data,
- convert the first metadata associated with the first data being managed by the software-defined data path to a data format suitable for the fixed-functionality data path in response to a need to carry out one or more of the fixed-functionality actions in conjunction with forwarding the first data,
- determine one of the fixed-functionality actions from among the fixed-functionality actions at least partly on the basis of which one of the look-up tables was most recently accessed when managing the first data, and
- controlling the determined one of the fixed-functionality actions to be carried out so as to initiate the needed one or more fixed-functionality actions to be carried out at least partly in accordance with the converted first metadata.

In accordance with the invention, there is provided also a new computer program product. The computer program product comprises a non-volatile computer readable medium, e.g. a compact disc "CD", encoded with a computer program according to the invention.

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features. The features recited in the accompanied dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

The exemplifying and non-limiting embodiments of the invention and their advantages are explained in greater detail below with reference to the accompanying drawings, in which.

DESCRIPTION OF EXEMPLIFYING AND NON-LIMITING EMBODIMENTS

Figure 1:
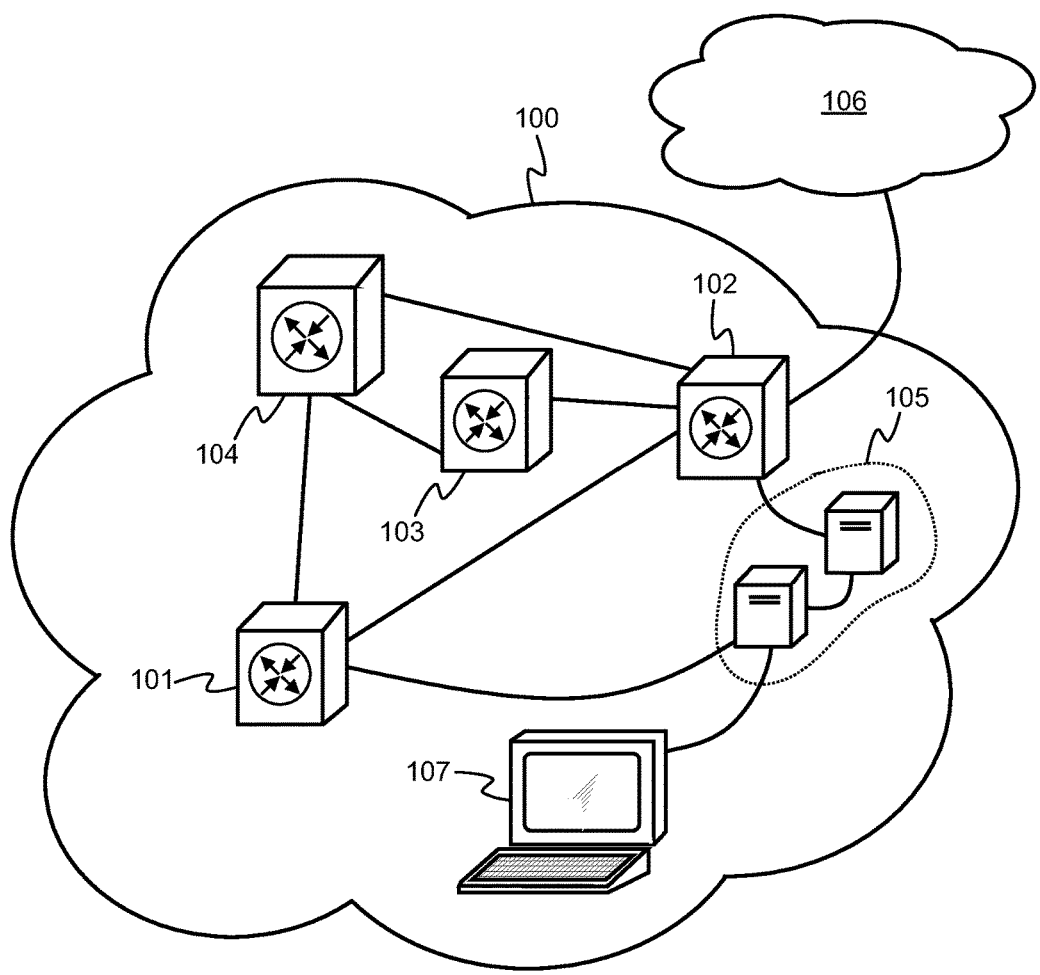
FIG. 1 shows a schematic illustration of a software-defined network comprising network elements according to an exemplifying and non-limiting embodiment of the invention.

FIG. 1 shows a schematic illustration of an exemplifying software-defined network "SDN" 100. The software-defined network comprises network elements 101, 102, 103, and 104 and a controller 105. The network elements 101-104 of this exemplifying software-defined network are mutually interconnected with data transfer links as illustrated in FIG. 1. Furthermore, the exemplifying software-defined network "SDN" 100 may comprise other network elements that are not shown in FIG. 1. Each of the network elements may be e.g. an Internet Protocol "IP" router, a multiprotocol label switching "MPLS" node, a packet optical switch, and/or an Ethernet switch. Each network element may consist of a single apparatus or a combination of a plurality of apparatuses. As well, the controller 105 may consist of a single apparatus or a combination of a plurality of apparatuses. In the exemplifying case illustrated in FIG. 1, the controller 105 comprises two interconnected apparatuses. A user interface device 107 is connected to the controller 105 and the network element 102 acts as a gateway to an external network 106 that can be e.g. the global Internet. The controller 105 comprises a data transfer interface for receiving data from the terminal device 107 and/or from one or more other devices connected with data transfer links to the data transfer interface of the controller. It is to be noted that the controller 105 or one or more parts of it can also act as one or more network elements that can be e.g. an Internet Protocol "IP" router, a multiprotocol label switching "MPLS" switch, a packet optical switch, and/or an Ethernet switch.

The controller 105 is adapted to send, to at least one of the network elements 101-104, configuration data for configuring the network element under consideration to maintain a software-defined data path that enables the network element to manage data in a desired manner. The software-defined data path comprises typically a system of interconnected look-up tables for selecting software-defined actions to be carried out in different operational situations. The data to be managed can be in form of data frames such as for example Internet Protocol IP-packets, MPLS-labeled frames, Ethernet frames, or the data can be in some other form accordant with one or more data transfer protocols being used. The controller 105 can be adapted to configure the network element under consideration in accordance with the OpenFlow, the ForCES, or some other protocol suitable for the software-defined networking.

In an exemplifying case where the OpenFlow is used, the software-defined data path comprises one or more flow tables and one or more group tables according to the OpenFlow specification. Each flow table contains a set of flow entries. Each flow entry may consist of match fields, counters, and a set of software-defined actions to apply to matching data frames. Matching typically starts at the first flow table and may continue to additional flow tables. Flow entries are typically arranged into a priority order and the first matching entry in each table is the one being used. If a matching flow entry is found, the one or more software-defined actions associated with this specific flow entry are executed. If no match is found in a flow table, the data frame under consideration may be forwarded to the controller 105 over an OpenFlow channel between the network element under consideration and the controller 105, the data frame may be dropped, or the data frame may continue to the next flow table or to a group table. Software-defined actions associated with each flow entry may comprise for example data frame forwarding, data frame modification, group table processing, and pipeline processing. Pipeline processing actions allow data frames to be sent to subsequent flow tables for further processing and allow information, in the form of metadata, to be communicated between the flow tables. In conjunction with the OpenFlow, the metadata is typically a bit vector having 64 bits. The pipeline processing stops when the one or more software-defined actions associated with a matching flow entry does not specify a next table. At this point the data frame under consideration is usually modified and forwarded. The group table processing actions allow data frames to be sent to a group table for further processing and allow information, in the form of metadata, to be communicated to the group table. The group table contains group entries, where each group entry may contain a list of software-defined actions to be executed in conjunction with data frames defined to belong to a particular group. Furthermore, the configuration data that is sent to one or more of the network elements 101-104 may comprise one or more configuration programs each of which comprising one or more computer executable instructions defining a software-defined action or a chain of software-defined actions to be executed in conjunction with managing data in the network element under consideration. The software-defined action or the chain of software-defined actions defined by the configuration program may comprise for example: recording data into a memory, modifying the data, selecting one or more of egress ports of the network element and forwarding the data and its possible duplicates to the selected one or more egress ports, selecting one or more look-up tables of a configuration system of the network element and executing one or more look-ups from the selected look-up tables, performing arithmetic operations, branching operations, performing logical operations, reading metadata associated with the data being managed, writing metadata associated with the data, modifying metadata associated with the data, dropping the data, and/or duplicating the data.

In many cases, the network elements 101-104 or at least some of them need to be hybrid network elements where both the above-presented programmable data path based on the software-defined networking and a traditional fixed-functionality data path are maintained for forwarding data. The traditional fixed-functionality data paths of the hybrid network elements can be configured and maintained in accordance with forwarding-parameter data, e.g. accessibility advertising data, transferred between the hybrid network elements according to a suitable protocol for exchanging accessibility information, e.g. a suitable Interior Gateway Protocol "IGP". The fixed-functionality data path can support for example one or more L3 network layer protocols, one or more L2 data link layer protocols, and/or the MultiProtocol Label Switching "MPLS" protocol. The "L3" refers to the Open System Interconnection "OSI" Level 3 network layer protocol, e.g. the Internet Protocol "IP", and the "L2" refers to the OSI Level 2 data link layer protocol, e.g. the Ethernet. Sometimes the MPLS is regarded as an OSI Level 2.5 "L2.5" protocol.

Without limiting the generality and merely for illustrative purposes, was can assume that the network element 101 is one of the above-mentioned hybrid network elements. The network element 101 comprises a data transfer interface for receiving and transmitting data. The network element 101 comprises means for constructing the software-defined data path in accordance with configuration data received from the controller 105. The software-defined data path comprises look-up tables for selecting software-defined actions. Data being managed by the software-defined data path is associated with metadata that allows information to be communicated between the look-up tables. Relating to the communication between the look-up tables, one or more of the software-defined actions modify the metadata when the corresponding data is managed by software-defined data path. The network element 101 comprises means for configuring the fixed-functionality data path in accordance with the forwarding-parameter data received at the network element. The fixed-functionality data path defines fixed-functionality actions such as e.g. Internet routing, Ethernet switching, Access Control List filtering, etc. Data being managed by the fixed-functionality data path is associated with metadata that allows information to be communicated between the fixed-functionality actions. Relating to the communication between the fixed-functionality actions, one or more of the fixed-functionality actions modify the metadata when the corresponding data is managed by fixed-functionality data path. The network element 101 comprises means for converting metadata associated with data being managed by the software-defined data path to a data format suitable for the fixed-functionality data path in response to a need to carry out one or more of the fixed-functionality actions in conjunction with forwarding the data under consideration. The network element 101 comprises means for determining one of the fixed-functionality actions from among the fixed-functionality actions at least partly on the basis of which one of the look-up tables of the software-defined data path was most recently accessed when managing the data by software-defined data path. The network element 101 comprises means for controlling the determined one of the fixed-functionality actions to be carried out so as to initiate the needed one or more fixed-functionality actions to be carried out at least partly in accordance with the converted metadata, i.e. to continue the operation in the fixed-functionality data path. Switching from the fixed-functionality data path to the software-defined data path can be arranged in a corresponding way. The switching from the fixed-functionality data path to the software-defined data path comprises converting metadata used in the fixed-functionality data path to a data format suitable for the software-defined data path. It is also possible to switch two or more times between the software-defined data path and the fixed-functionality data path when managing data to be forwarded.

Figure 2A:
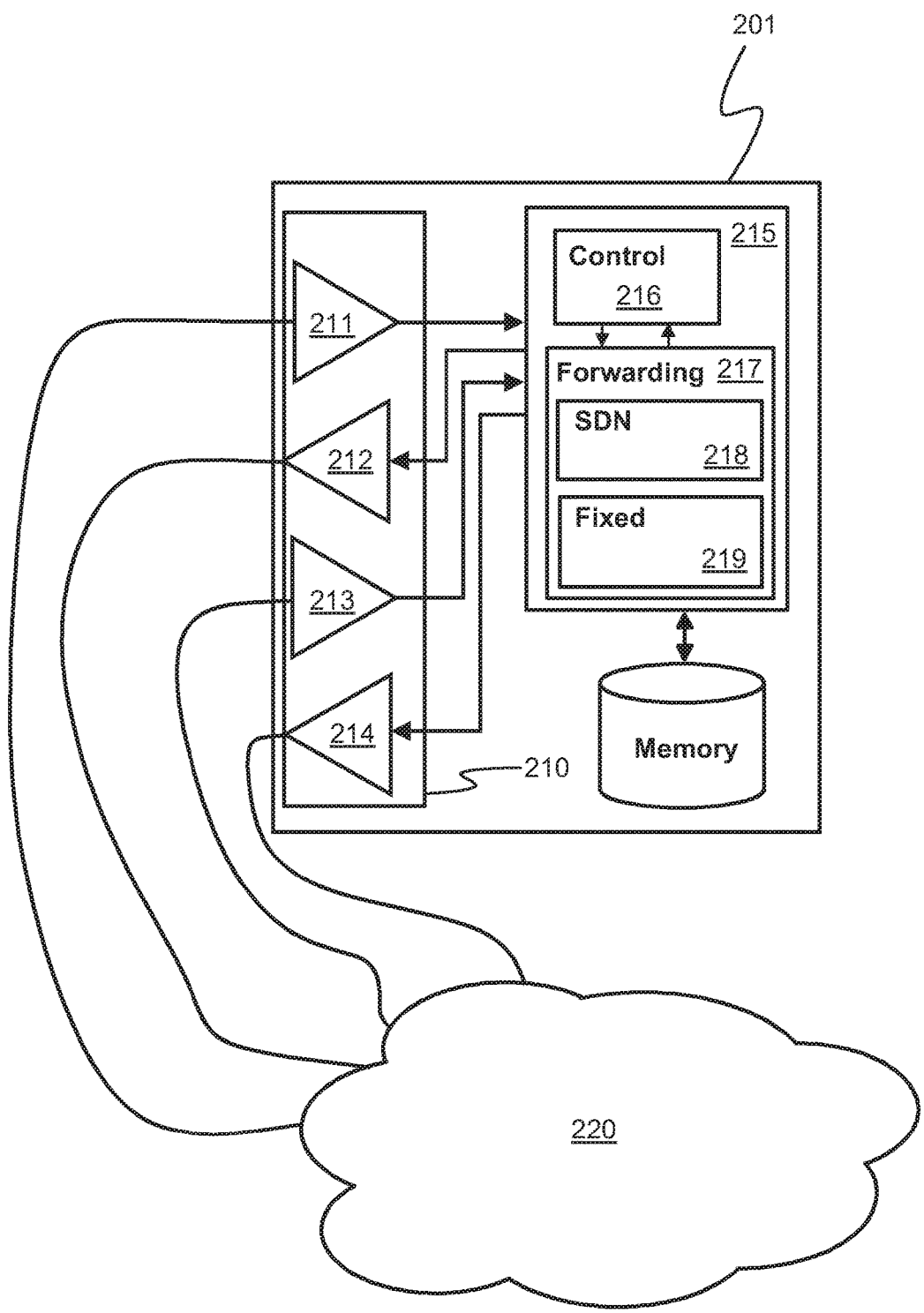
FIG. 2a shows a schematic illustration of a network element according to an exemplifying and non-limiting embodiment of the invention.

FIG. 2a shows a schematic illustration of a network element 201 according to an exemplifying and non-limiting embodiment of the invention. The network element can be, for example, an Internet Protocol "IP" router, a Multiprotocol label switching "MPLS" switch, a packet optical switch, and/or an Ethernet switch. The network element comprises a data transfer interface 210 for receiving data and for transmitting data. The data transfer interface 210 comprises ingress ports 211 and 213 and egress ports 212 and 214 for connecting via data transfer links to a data transfer network 220. The network element 201 comprises a processing system 215 that comprises a control section 216 and a forwarding section 217. The control section 216 is adapted to construct a software-defined data path 218 in accordance with configuration data received from a controller of a software-defined network. The control section 216 is adapted to configure a fixed-functionality data path 219 in accordance with forwarding-parameter data, e.g. accessibility advertising data, received at the network element 101 from other network elements. The software-defined data path 218 comprises look-up tables for selecting software-defined actions when managing data to be forwarded, and the fixed-functionality data path 219 defines fixed-functionality actions for managing data to be forwarded.

Figure 2B:
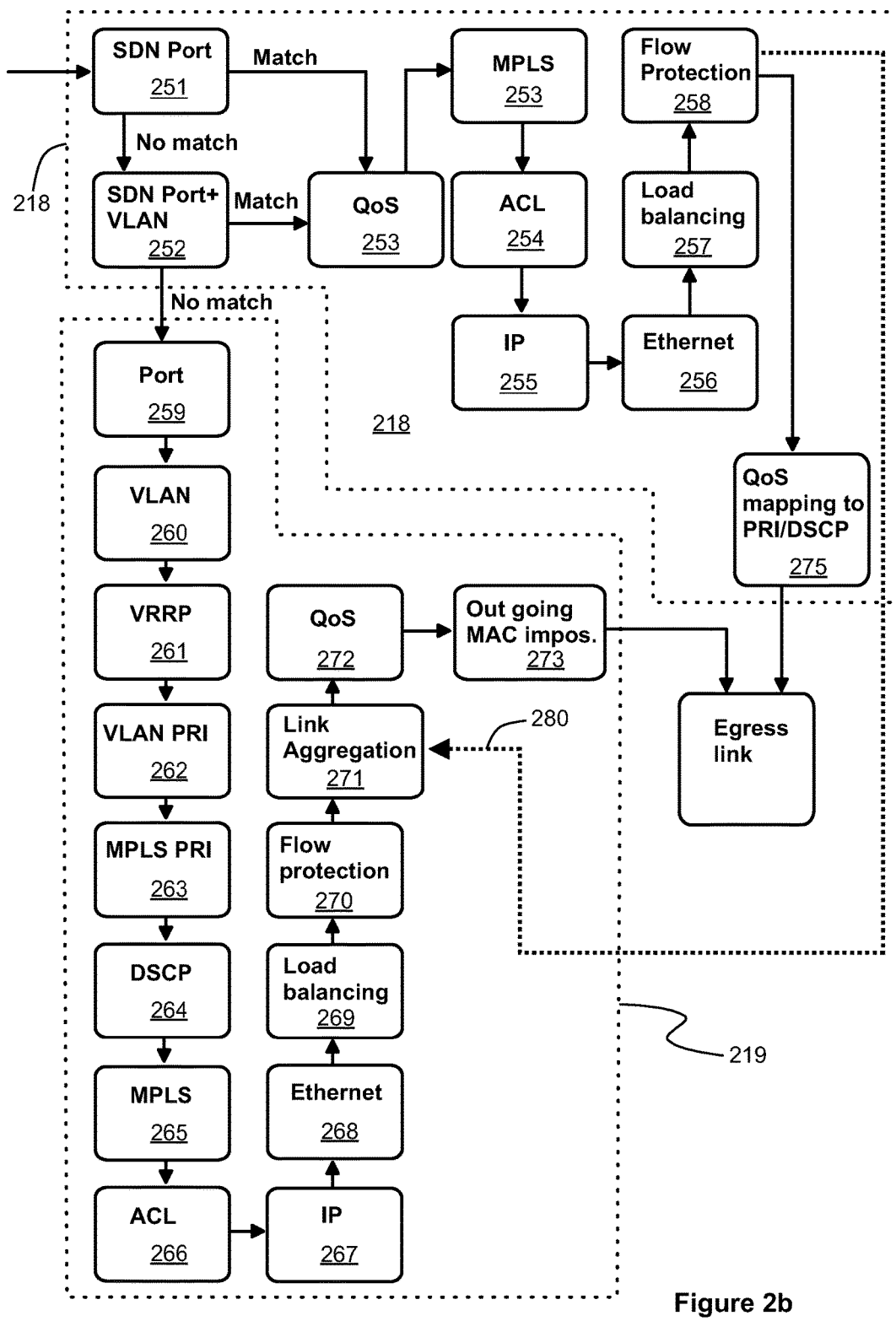
FIG. 2b shows a functional block diagram illustrating an exemplifying software-defined data path and an exemplifying fixed-functionality data path of the network element illustrated in FIG. 2a, and FIG. 3 shows a flow chart of a method according to an exemplifying and nonlimiting embodiment of the invention for managing data in a network element of a software-defined network.

In an exemplifying situation, the software-defined data path 218 and the fixed-functionality data path 219 can be such as illustrated by a functional block diagram shown in FIG. 2b. In the exemplifying case illustrated in FIG. 2b, the software-defined data path 218 comprises look-up tables "SDN Port" 251 and "SDN Port+VLAN" 252 suitable for determining whether the software-defined data path 218 or the fixed-functionality data path 219 is to be used. The acronym "VLAN" means a virtual local access network. Furthermore, the software-defined data path 218 comprises a look-up table "QoS" 253 suitable for quality-of-service management, a look-up table "MPLS" 253 suitable for MultiProtocol Label Switching, a look-up table "ACL" 254 suitable for Access Control List filtering, a look-up table "IP" 255 suitable for Internet Protocol IP routing, a look-up table "Ethernet" 256 suitable for Ethernet switching, a look-up table 257 suitable for load balancing, a look-up table 258 suitable for flow protection, and means suitable for mapping quality of service "QoS" parameters to the MPLS Priority "PRI" field and/or to the Differentiated Service Code Point "DSCP". In the exemplifying case illustrated in FIG. 2b, the fixed-functionality data path 219 comprises functionalities 259 and 260 for port and VLAN management, functionality 261 for the Virtual Router Redundancy Protocol VRRP destination Media Access Control MAC filtering, functionality 262 for VLAN priority management, functionality 263 for MPLS priority management, functionality 264 for the Differentiated Service Code Point "DSCP" management, functionality 265 for MultiProtocol Label Switching, functionality 266 for access control list "ACL" filtering, functionality 267 for Internet Protocol "IP"-routing, functionality 268 for Ethernet switching, functionality 269 for load balancing, functionality 270 for flow protection, functionality 271 for link aggregation, functionality 272 for Quality of Service management, and functionality 273 for the Outgoing Media Access Control MAC imposition.

Without limiting the generality and merely for illustrative purposes, we can assume that first data to be forwarded is initially managed by the software-defined data path 218 and second data to be forwarded is initially managed by the fixed-functionality data path 219. Furthermore, we assume that the first data is associated with first metadata allowing information to be communicated between the look-up tables, and that the second data is associated with second metadata allowing information to be communicated between the fixed-functionality actions. One or more of the software-defined actions are assumed to modify the first metadata when the first data is managed by the software-defined data path 218. Correspondingly, one or more of the fixed-functionality actions is assumed to modify the second metadata when the second data is managed by the fixed-functionality data path 219. The forwarding section 217 of the processing system 215 shown in FIG. 2a is adapted to convert the first metadata to a data format suitable for the fixed-functionality data path 219 in response to a need to carry out one or more of the fixed-functionality actions in conjunction with forwarding the first data. The forwarding section 217 is adapted to determine a first one of the fixed-functionality actions from among the fixed-functionality actions at least partly on the basis of which one of the look-up tables of the software-defined data path 218 was most recently accessed when managing the first data. The forwarding section 217 is adapted to control the determined first one of the fixed-functionality actions to be carried out so as to initiate the needed one or more fixed-functionality actions to be carried out at least partly in accordance with the converted first metadata. FIG. 2b illustrates an exemplifying situation where there is a need to switch from the software-defined data path 218 to the fixed functionality data path 219 after carrying out the flow protection with the aid of the look-up table 258 of the software-defined data path 218. On the basis of the fact that the most recently accessed look-up table of the software-defined data path 218 is the look-up table 258, the link aggregation functionality 271 is selected from among the fixed-functionality actions of the fixed-functionality data path 219. Thereafter, the link aggregation functionality 271 is controlled to be carried out at least partly in accordance with the converted first metadata. The switching from the software-defined data path 218 to the fixed functionality data path 219 is depicted with a dashed-line arrow 280 in FIG. 2b.

In network element according to an exemplifying and non-limiting embodiment of the invention, the processing system 215 is adapted to carry out the following actions in order to switch the managing of the second data from the fixed functionality data path 219 to the software-defined data path 218:
  converting the second metadata associated with the second data to a data format suitable for the software-defined data path in response to a need to carry out one or more of the software-defined actions in conjunction with forwarding the second data,
  determining a first one of the look-up tables of the software-defined data path at least partly on the basis of which one of the fixed-functionality actions was most recently carried out when managing the second data, and
  carrying out a look-up from the determined first one of the look-up tables so as to initiate the one or more needed software-defined actions to be carried out at least partly in accordance with the converted second metadata.

In network element according to an exemplifying and non-limiting embodiment of the invention, the processing system 215 is adapted to carry out the following actions in order to switch the managing of the first data from the fixed functionality data path 219 back to the software-defined data path 218:
  converting the converted first metadata back to a data format suitable for the software-defined data path in response to a need to carry out one or more of the software-defined actions after carrying out the needed one or more fixed-functionality actions,
  determining a second one of the look-up tables of the software-defined data path at least partly on the basis of which one of the one or more needed fixed-functionality actions was most recently carried out when managing the first data by the fixed-functionality data path,
  carrying out a look-up from the determined second one of the look-up tables so as to initiate the one or more software-defined actions needed to be carried out, at least partly in accordance with the back converted first metadata, after the one or more needed fixed-functionality actions.

In network element according to an exemplifying and non-limiting embodiment of the invention, the processing system 215 is adapted to carry out the following actions in order to switch the managing of the second data from the software-defined data path 218 back to the fixed functionality data path 219:
  converting the converted second metadata back to the data format suitable for the fixed-functionality data path in response to a need to carry out one or more of the fixed-functionality actions after carrying out the needed one or more software-defined actions,
  determining a second one of the fixed-functionality actions from among the fixed-functionality actions at least partly on the basis of which one of the look-up tables was most recently accessed when managing the second data by the software-defined data path,
  controlling the determined second one of the fixed-functionality actions to be carried out so as to initiate the one or more fixed-functionality actions needed to be carried out, at least partly in accordance with the back converted second metadata, after the one or more needed software-defined actions.

In network element according to an exemplifying and non-limiting embodiment of the invention, the processing system 215 is adapted to construct the software-defined data path 218 in accordance with the OpenFlow protocol and/or the Forwarding and Control Element Separation "ForCES" protocol.

In network element according to an exemplifying and non-limiting embodiment of the invention, the processing system 215 is adapted to configure the fixed-functionality data path in accordance with one or more L3 network layer routing protocols, one or more L2 data link layer control protocols, and/or one or more MultiProtocol Label Switching MPLS signaling protocols.

The one or more L3 network layer routing protocols may comprise for example at least one of the following: the Open Shortest Path First OSPF, the Intermediate system-Intermediate system ISIS, the Border Gateway Protocol BGP, the Protocol Independent multicast Sparse Mode PIM-SM. The one or more L2 data link layer control protocols may comprise for example at least one of the following: the Spanning Tree Protocol STP, the Rapid Spanning Tree Protocol RSTP, the multiple Spanning Tree Protocol MSTP, the Transparent Interconnection of Lots of Links TRILL, the Link Aggregation Control Protocol LACP. The one or more MultiProtocol Label Switching MPLS signaling protocols may comprise for example at least one of the following: Label Distribution Protocol LDP, Resource Reservation Protocol-Traffic Engineering RSVP-TE, the Border Gateway Protocol BGP.

The processing system 215 can be implemented with one or more processor circuits, each of which can be a programmable processor circuit provided with appropriate software, a dedicated hardware processor such as, for example, an application specific integrated circuit "ASIC", or a configurable hardware processor such as, for example, a field programmable gate array "FPGA".

Figure 3:
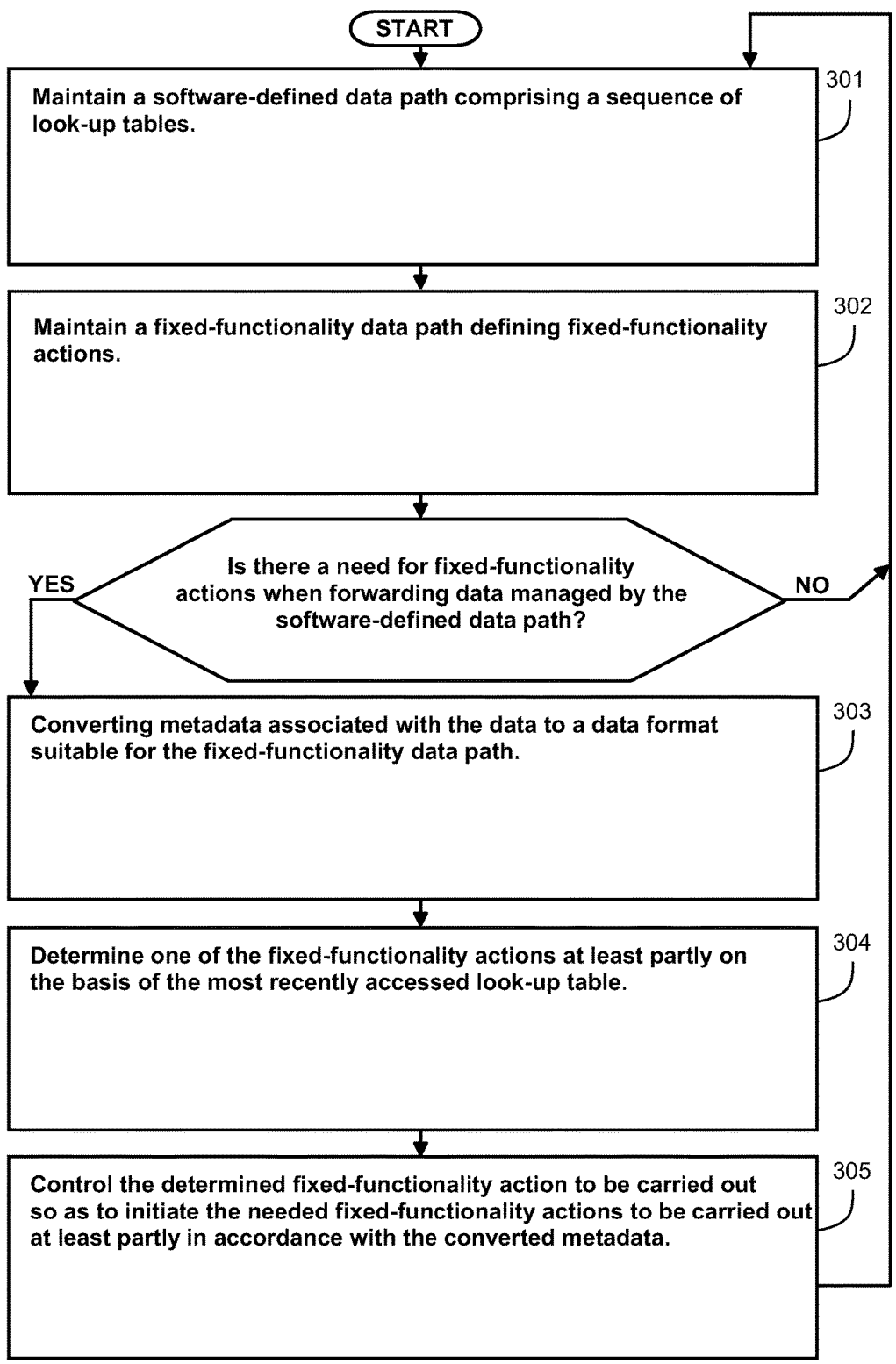

FIG. 3 shows a flow chart of a method according to an exemplifying and nonlimiting embodiment of the invention for managing data in a network element of a software-defined network. The method comprises the following actions:
  action 301: maintaining, in accordance with configuration data received from a controller of the software-defined network, a software-defined data path for managing first data to be forwarded, the software-defined data path comprising look-up tables for selecting software-defined actions and one or more of the software-defined actions modifying first metadata associated with the first data, and action 302: maintaining, in accordance with forwarding-parameter data received at the network element, a fixed-functionality data path for managing second data to be forwarded, the fixed-functionality data path defining fixed-functionality actions and one or more of the fixed-functionality actions modifying second metadata associated with the second data, action 303: converting the first metadata associated with the first data being managed by the software-defined data path to a data format suitable for the fixed-functionality data path in response to a need to carry out one or more of the fixed-functionality actions in conjunction with forwarding the first data, action 304: determining a first one of the fixed-functionality actions from among the fixed-functionality actions at least partly on the basis of which one of the look-up tables was most recently accessed when managing the first data, and action 305: controlling the determined first one of the fixed-functionality actions to be carried out so as to initiate the needed one or more fixed-functionality actions to be carried out at least partly in accordance with the converted first metadata.

A method according to an exemplifying and non-limiting embodiment of the invention comprises the following actions in order to switch the managing of the second data from the fixed functionality data path to the software-defined data path:

converting the second metadata associated with the second data being managed by the fixed-functionality data path to a data format suitable for the software-defined data path in response to a need to carry out one or more of the software-defined actions in conjunction with forwarding the second data, determining a first one of the look-up tables of the software-defined data path at least partly on the basis of which one of the fixed-functionality actions was most recently carried out when managing the second data, and carrying out a look-up from the determined first one of the look-up tables so as to initiate the one or more needed software-defined actions to be carried out at least partly in accordance with the converted second metadata.

A method according to an exemplifying and non-limiting embodiment of the invention comprises the following actions in order to switch the managing of the first data from the fixed functionality data path back to the software-defined data path:

converting the converted first metadata back to a data format suitable for the software-defined data path in response to a need to carry out one or more of the software-defined actions after carrying out the needed one or more fixed-functionality actions, determining a second one of the look-up tables of the software-defined data path at least partly on the basis of which one of the one or more needed fixed-functionality actions was most recently carried out when managing the first data by the fixed-functionality data path, carrying out a look-up from the determined second one of the look-up tables so as to initiate the one or more software-defined actions needed to be carried out, at least partly in accordance with the back converted first metadata, after the one or more needed fixed-functionality actions.

A method according to an exemplifying and non-limiting embodiment of the invention comprises the following actions in order to switch the managing of the second data from the software-defined data path back to the fixed functionality data path:

converting the converted second metadata back to the data format suitable for the fixed-functionality data path in response to a need to carry out one or more of the fixed-functionality actions after carrying out the needed one or more software-defined actions, determining a second one of the fixed-functionality actions from among the fixed-functionality actions at least partly on the basis of which one of the look-up tables was most recently accessed when managing the second data by the software-defined data path, controlling the determined second one of the fixed-functionality actions to be carried out so as to initiate the one or more fixed-functionality actions needed to be carried out, at least partly in accordance with the back converted second metadata, after the one or more needed software-defined actions.

In a method according to an exemplifying and non-limiting embodiment of the invention, the software-defined data path is maintained in accordance with at least one of the following: the OpenFlow protocol, the Forwarding and Control Element Separation ForCES protocol.

In a method according to an exemplifying and non-limiting embodiment of the invention, the fixed-functionality data path is maintained in accordance with at least one of the following: one or more L3 network layer routing protocols, one or more L2 data link layer control protocols, one or more MultiProtocol Label Switching MPLS signaling protocols.

The one or more L3 network layer routing protocols may comprise for example at least one of the following: the Open Shortest Path First OSPF, the Intermediate system-Intermediate system ISIS, the Border Gateway Protocol BGP, the Protocol Independent multicast Sparse Mode PIM-SM. The one or more L2 data link layer control protocols may comprise for example at least one of the following: the Spanning Tree Protocol STP, the Rapid Spanning Tree Protocol RSTP, the multiple Spanning Tree Protocol MSTP, the Transparent Interconnection of Lots of Links TRILL, the Link Aggregation Control Protocol LACP. The one or more MultiProtocol Label Switching MPLS signaling protocols may comprise for example at least one of the following: Label Distribution Protocol LDP, Resource Reservation Protocol-Traffic Engineering RSVP-TE, the Border Gateway Protocol BGP.

In a method according to an exemplifying and non-limiting embodiment of the invention, the software-defined data path comprises at least one of the following: a look-up table suitable for selecting between the software-defined data path and the fixed-functionality data path, a look-up table suitable for quality-of-service QoS management, a look-up table suitable for MultiProtocol Label Switching MPLS, a look-up table suitable for Access Control List ACL filtering, a look-up table suitable for Internet Protocol IP routing, a look-up table suitable for Ethernet switching, a look-up table suitable for load balancing, a look-up table suitable for flow protection.

In a method according to an exemplifying and non-limiting embodiment of the invention, the fixed-functionality data path is capable of carrying out at least one of the following: Virtual Local Access Network VLAN management, Virtual Router Redundancy Protocol VRRP destination Media Access Control MAC filtering, quality-of-service management, MultiProtocol Label Switching MPLS, Access Control List ACL filtering, Internet Protocol IP routing, Ethernet switching, load balancing, flow protection, link aggregation, Outgoing Media Access Control MAC imposition.

A computer program according to an exemplifying and non-limiting embodiment of the invention comprises computer executable instructions for controlling a programmable processing system to carry out actions related to a method according to any of the above-described exemplifying embodiments of the invention.

A computer program according to an exemplifying and non-limiting embodiment of the invention comprises software modules for controlling a network element of a software-defined network. The software modules comprise computer executable instructions for controlling a programmable processing system of the network element to:

construct, in accordance with configuration data received from a controller of the software-defined network, a software-defined data path for managing first data to be forwarded, the software-defined data path comprising lookup tables for selecting software-defined actions and one or more of the software-defined actions modifying first metadata associated with the first data, configure, in accordance with forwarding-parameter data received at the network element, a fixed-functionality data path for managing second data to be forwarded, the fixed-functionality data path defining fixed-functionality actions and one or more of the fixed-functionality actions modifying second metadata associated with the second data, convert the first metadata associated with the first data being managed by the software-defined data path to a data format suitable for the fixed-functionality data path in response to a need to carry out one or more of the fixed-functionality actions in conjunction with forwarding the first data, determine one of the fixed-functionality actions from among the fixed-functionality actions at least partly on the basis of which one of the look-up tables was most recently accessed when managing the first data, and control the determined one of the fixed-functionality actions to be carried out so as to initiate the needed one or more fixed-functionality actions to be carried out at least partly in accordance with the converted first metadata.

The software modules can be e.g. subroutines or functions implemented with a suitable programming language and with a compiler suitable for the programming language and the programmable processing system.

A computer program product according to an exemplifying and non-limiting embodiment of the invention comprises a computer readable medium, e.g. a compact disc "CD", encoded with a computer program according to an exemplifying embodiment of invention.

A signal according to an exemplifying and non-limiting embodiment of the invention is encoded to carry information defining a computer program according to an exemplifying embodiment of invention.

The specific examples provided in the description given above should not be construed as limiting the scope and/or the applicability of the appended claims.

What is claimed is:

1. A network element for a software-defined network, the network element comprising a data transfer interface for receiving and transmitting data and a processing system adapted to:

construct, in accordance with configuration data received from a controller of the software-defined network, a software-defined data path for managing first data to be forwarded, the software-defined data path comprising look-up tables for selecting software-defined actions and one or more of the software-defined actions modifying first metadata associated with the first data;

configure, in accordance with forwarding-parameter data received at the network element, a fixed-functionality data path for managing second data to be forwarded, the fixed-functionality data path defining fixed-functionality actions and one or more of the fixed-functionality actions modifying second metadata associated with the second data;

convert the first metadata associated with the first data being managed by the software-defined data path to a data format suitable for the fixed-functionality data path in response to a need to carry out one or more of the fixed-functionality actions in conjunction with forwarding the first data;

determine a first one of the fixed-functionality actions from among the fixed-functionality actions at least partly on the basis of which one of the look-up tables was most recently accessed when managing the first data; and control the determined first one of the fixed-functionality actions to be carried out so as to initiate the needed one or more fixed-functionality actions to be carried out at least partly in accordance with the converted first metadata.

2. The network element according to claim 1, wherein the processing system is further adapted to:

convert the second metadata associated with the second data being managed by the fixed-functionality data path to a data format suitable for the software-defined data path in response to a need to carry out one or more of the software-defined actions in conjunction with forwarding the second data, determine a first one of the look-up tables of the software-defined data path at least partly on the basis of which one of the fixed-functionality actions was most recently carried out when managing the second data, and carry out a look-up from the determined first one of the look-up tables so as to initiate the one or more needed software-defined actions to be carried out at least partly in accordance with the converted second metadata.

3. The network element according to claim 1, wherein the processing system is further adapted to:

convert the converted first metadata back to a data format suitable for the software-defined data path in response to a need to carry out one or more of the software-defined actions after carrying out the needed one or more fixed-functionality actions;

determine a second one of the look-up tables of the software-defined data path at least partly on the basis of which one of the one or more needed fixed-functionality actions was most recently carried out when managing the first data by the fixed-functionality data path; and carry out a look-up from the determined second one of the look-up tables so as to initiate the one or more software-defined actions needed to be carried out after the one or more needed fixed-functionality actions and at least partly in accordance with the back converted first metadata.

4. The network element according to claim 2, wherein the processing system is further adapted to:
convert the converted second metadata back to the data format suitable for the fixed-functionality data path in response to a need to carry out one or more of the fixed-functionality actions after carrying out the needed one or more software-defined actions;
determine a second one of the fixed-functionality actions from among the fixed-functionality actions at least partly on the basis of which one of the look-up tables was most recently accessed when managing the second data by the software-defined data path; and
control the determined second one of the fixed-functionality actions to be carried out so as to initiate the one or more fixed-functionality actions needed to be carried out after the one or more needed software-defined actions and at least partly in accordance with the back converted second metadata.

5. The network element according to claim 1, wherein the processing system is adapted to construct the software-defined data path in accordance with at least one of the following: the OpenFlow protocol, the Forwarding and Control Element Separation ForCES protocol.

6. The network element according to claim 1, wherein the processing system is adapted to configure the fixed-functionality data path in accordance with at least one of the following: one or more L3 network layer routing protocols, one or more L2 data link layer control protocols, one or more MultiProtocol Label Switching MPLS signaling protocols.

7. The network element according to claim 6, wherein:
the one or more L3 network layer routing protocols comprise at least one of the following: the Open Shortest Path First OSPF, the Intermediate system-Intermediate system ISIS, the Border Gateway Protocol BGP, the Protocol Independent multicast Sparse Mode PIM-SM;
the one or more L2 data link layer control protocols comprise at least one of the following: the Spanning Tree Protocol STP, the Rapid Spanning Tree Protocol RSTP, the multiple Spanning Tree Protocol MSTP, the Transparent Interconnection of Lots of Links TRILL, the Link Aggregation Control Protocol LACP; and
the one or more MultiProtocol Label Switching MPLS signaling protocols comprise at least one of the following:
Label Distribution Protocol LDP, Resource Reservation Protocol-Traffic Engineering RSVP-TE, the Border Gateway Protocol BGP.

8. The network element according to claim 1, wherein the software-defined data path comprises at least one of the following: a look-up table suitable for selecting between the software-defined data path and the fixed-functionality data path, a look-up table suitable for quality-of-service QoS management, a look-up table suitable for MultiProtocol Label Switching MPLS, a look-up table suitable for Access Control List ACL filtering, a look-up table suitable for Internet Protocol IP routing, a look-up table suitable for Ethernet switching, a look-up table suitable for load balancing, a look-up table suitable for flow protection.

9. The network element according to claim 1, wherein the fixed-functionality data path is capable of carrying out at least one of the following: Virtual Local Access Network VLAN management, Virtual Router Redundancy Protocol VRRP destination Media Access Control MAC filtering, quality-of-service management, MultiProtocol Label Switching MPLS, Access Control List ACL filtering, Internet Protocol IP routing, Ethernet switching, load balancing, flow protection, link aggregation, Outgoing Media Access Control MAC imposition.

10. A method for managing data in a network element of a software-defined network, the method comprising:
maintaining, in accordance with configuration data received from a controller of the software-defined network, a software-defined data path for managing first data to be forwarded, the software-defined data path comprising look-up tables for selecting software-defined actions and one or more of the software-defined actions modifying first metadata associated with the first data;
maintaining, in accordance with forwarding-parameter data received at the network element, a fixed-functionality data path for managing second data to be forwarded, the fixed-functionality data path defining fixed-functionality actions and one or more of the fixed-functionality actions modifying second metadata associated with the second data;
converting the first metadata associated with the first data being managed by the software-defined data path to a data format suitable for the fixed-functionality data path in response to a need to carry out one or more of the fixed-functionality actions in conjunction with forwarding the first data;
determining a first one of the fixed-functionality actions from among the fixed-functionality actions at least partly on the basis of which one of the look-up tables was most recently accessed when managing the first data; and
controlling the determined first one of the fixed-functionality actions to be carried out so as to initiate the needed one or more fixed-functionality actions to be carried out at least partly in accordance with the converted first metadata.

11. The method according to claim 10, wherein the method further comprises:
converting the second metadata associated with the second data being managed by the fixed-functionality data path to a data format suitable for the software-defined data path in response to a need to carry out one or more of the software-defined actions in conjunction with forwarding the second data,
determining a first one of the look-up tables of the software-defined data path at least partly on the basis of which one of the fixed-functionality actions was most recently carried out when managing the second data, and
carrying out a look-up from the determined first one of the look-up tables so as to initiate the one or more needed software-defined actions to be carried out at least partly in accordance with the converted second metadata.

12. The method according to claim 10, wherein the method further comprises:
converting the converted first metadata back to a data format suitable for the software-defined data path in response to a need to carry out one or more of the software-defined actions after carrying out the needed one or more fixed-functionality actions;
determining a second one of the look-up tables of the software-defined data path at least partly on the basis of which one of the one or more needed fixed-functionality actions was most recently carried out when managing the first data by the fixed-functionality data path; and carrying out a look-up from the determined second one of the look-up tables so as to initiate the one or more software-defined actions needed to be carried out after the one or more needed fixed-functionality actions and at least partly in accordance with the back converted first metadata.

13. The method according to claim 11, wherein the method further comprises:

converting the converted second metadata back to the data format suitable for the fixed-functionality data path in response to a need to carry out one or more of the fixed-functionality actions after carrying out the needed one or more software-defined actions;

determining a second one of the fixed-functionality actions from among the fixed-functionality actions at least partly on the basis of which one of the look-up tables was most recently accessed when managing the second data by the software-defined data path; and controlling the determined second one of the fixed-functionality actions to be carried out so as to initiate the one or more fixed-functionality actions needed to be carried out after the one or more needed software-defined actions and at least partly in accordance with the back converted second metadata.

14. The method according to claim 10, wherein the software-defined data path is maintained in accordance with at least one of the following: the OpenFlow protocol, the Forwarding and Control Element Separation ForCES protocol.

15. The method according to claim 10, wherein the fixed-functionality data path is maintained in accordance with at least one of the following: one or more L3 network layer routing protocols, one or more L2 data link layer control protocols, one or more MultiProtocol Label Switching MPLS signaling protocols.

16. The method according to claim 15, wherein:

the one or more L3 network layer routing protocols comprise at least one of the following: the Open Shortest Path First OSPF, the Intermediate system-Intermediate system ISIS, the Border Gateway Protocol BGP, the Protocol Independent multicast Sparse Mode PIM-SM, the one or more L2 data link layer control protocols comprise at least one of the following: the Spanning Tree Protocol STP, the Rapid Spanning Tree Protocol RSTP, the multiple Spanning Tree Protocol MSTP, the Transparent Interconnection of Lots of Links TRILL, the Link Aggregation Control Protocol LACP, and the one or more MultiProtocol Label Switching MPLS signaling protocols comprise at least one of the following:

Label Distribution Protocol LDP, Resource Reservation Protocol-Traffic Engineering RSVP-TE, the Border Gateway Protocol BGP.

17. The method according to claim 10, wherein the software-defined data path comprises at least one of the following: a look-up table suitable for selecting between the software-defined data path and the fixed-functionality data path, a look-up table suitable for quality-of-service QoS management, a look-up table suitable for MultiProtocol Label Switching MPLS, a look-up table suitable for Access Control List ACL filtering, a look-up table suitable for Internet Protocol IP routing, a look-up table suitable for Ethernet switching, a look-up table suitable for load balancing, a look-up table suitable for flow protection.

18. The method according to claim 10, wherein the fixed-functionality data path is capable of carrying out at least one of the following: Virtual Local Access Network VLAN management, Virtual Router Redundancy Protocol VRRP destination Media Access Control MAC filtering, quality-of-service management, MultiProtocol Label Switching MPLS, Access Control List ACL filtering, Internet Protocol IP routing, Ethernet switching, load balancing, flow protection, link aggregation, Outgoing Media Access Control MAC imposition.

19. A non-transitory computer readable medium encoded with a computer program recorded thereon comprising computer executable instructions for, upon execution by a programmable processing system of a network element of a software-defined network controlling the network element to:

construct, in accordance with configuration data received from a controller of the software-defined network, a software-defined data path for managing first data to be forwarded, the software-defined data path comprising look-up tables for selecting software-defined actions and one or more of the software-defined actions modifying first metadata associated with the first data;

configure, in accordance with forwarding-parameter data received at the network element, a fixed-functionality data path for managing second data to be forwarded, the fixed-functionality data path defining fixed-functionality actions and one or more of the fixed-functionality actions modifying second metadata associated with the second data;

convert the first metadata associated with the first data being managed by the software-defined data path to a data format suitable for the fixed-functionality data path in response to a need to carry out one or more of the fixed-functionality actions in conjunction with forwarding the first data;

determine one of the fixed-functionality actions from among the fixed-functionality actions at least partly on the basis of which one of the look-up tables was most recently accessed when managing the first data; and control the determined one of the fixed-functionality actions to be carried out so as to initiate the needed one or more fixed-functionality actions to be carried out at least partly in accordance with the converted first metadata.

* * * * *